April 15, 1947. J. D. PETERSON ET AL 2,419,087

MEANS FOR REPRODUCING MOTION

Filed May 28, 1943　　3 Sheets-Sheet 1

INVENTORS
Joel D. Peterson
Paul F. Bechberger.
BY
Attorney

April 15, 1947.  J. D. PETERSON ET AL  2,419,087

MEANS FOR REPRODUCING MOTION

Filed May 28, 1943  3 Sheets-Sheet 2

Fig. 2.

INVENTORS
Joel D. Peterson
BY Paul F. Bechberger

Attorney

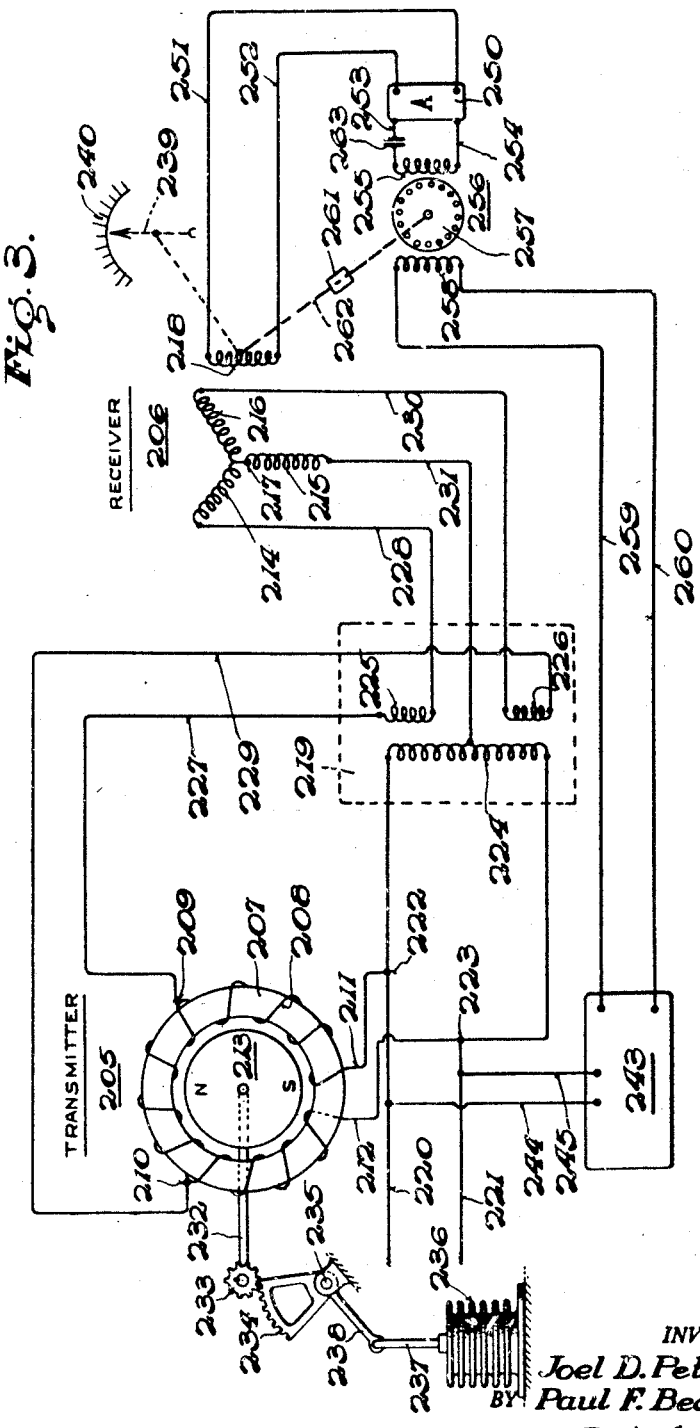

Patented Apr. 15, 1947

2,419,087

UNITED STATES PATENT OFFICE 2,419,087

MEANS FOR REPRODUCING MOTION

Joel D. Peterson, Ridgewood, and Paul F. Bechberger, Tenafly, N. J., assignors to Bendix Aviation Corporation, Bendix, N. J., a corporation of Delaware Application May 28, 1943, Serial No. 488,898

14 Claims. (Cl. 172—239)

1

The present invention relates to means for reproducing motion, and more particularly to novel and improved means for reproducing angular motion at a remote point for indicating and/or control purposes.

It is known in the art to provide a telemetric system comprising two generally similar units, one acting as a transmitter of motion imparted thereto and the other as a receiver for reproducing the exact amount of motion imparted to the transmitter. Illustrative of such known systems, for example, is Patent No. 2,269,602 issued to W. A. Reichel on January 13, 1942, and assigned to the assignee of the present invention. These systems are highly effective where it is practical to use two like units but in some applications it is desired to transmit and reproduce motion at a remote point with the use of two dissimilar units.

An object of the present invention, therefore, is to provide a novel telemetric system wherein the transmitter and receiver units are of dissimilar nature.

Another object of the invention is to provide a novel telemetric system having one type of a unit acting as a transmitter or receiver connected with a dissimilar unit which may act as a receiver or a transmitter.

A further object of the invention is to provide a novel transformer adapted for coupling two dissimilar units to thereby provide a novel telemetric system.

Another object is to provide a novel telemetric system having two units, one acting as a transmitter of motion and the other as a reproducer of motion, one of the units being of the inductive type having a wound stator and a wound rotor, and the other being an electromagnetic device having a wound stator and an unwound rotor comprising a permanent magnet.

A further object is to provide a novel telemetric system comprising a transmitter unit dissimilar from the receiver unit wherein the latter unit may act as an indicator of the amount of reproduced motion or as a control for a follow-up system.

Another object of the invention is to provide a novel coupling transformer with the use of which a unit having a wound rotor may be coupled with a unit having only a permanent magnet for a rotor to provide a novel motion reproducing system in which either unit may be used as a transmitter or as a receiver.

The foregoing and other objects and advantages of the present invention will appear more fully hereinafter from a consideration of the detailed description which follows, taken together with the accompanying drawings wherein three embodiments of the invention are illustrated by way of example. It is to be expressly understood, however, that the drawings are for the purposes of illustration only and are not to be construed as defining the limits of the invention, reference being had for this purpose to the appended claims.

In the drawings:

Figure 2 is a diagrammatic illustration of another embodiment of the invention in which the receiver of Figure 1 is used as the transmitter and the transmitter of Figure 1 is used as the receiver.

Figure 3 is a diagrammatic illustration of a further embodiment of the invention wherein the arrangement of Figure 1 is adapted as a control for a follow-up system.

Figure 1:
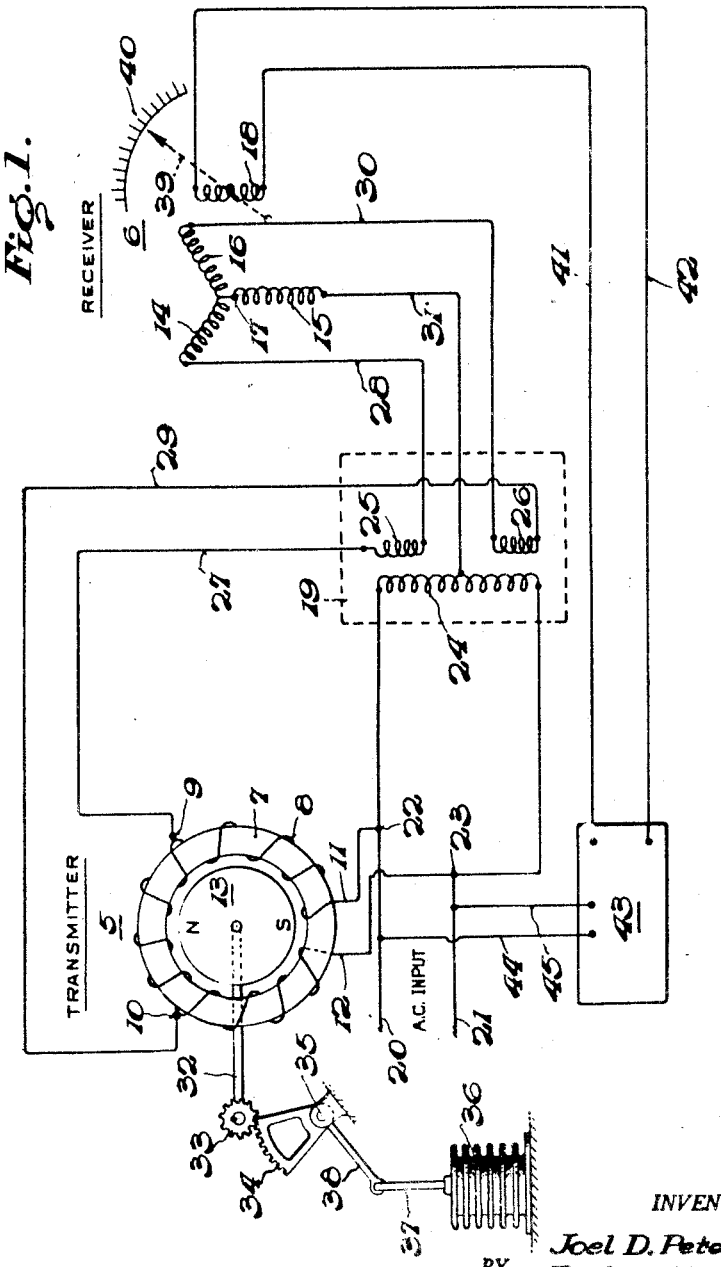
Figure 1 is a more or less diagrammatic illustration of one embodiment of the invention wherein a transmitter provided with a permanent magnetic rotor is connected through a novel transformer coupling with a receiver provided with a wound rotor.

The invention consists substantially in the construction, combination, location and relative arrangement of parts and circuits for obtaining the results desired in accordance with the foregoing objects, as will be more fully hereinafter set forth in the specification, as shown in the drawings by way of example, and as finally pointed out in the claims.

Referring now to the drawings and more particularly to Figure 1 thereof, the novel apparatus of the present invention comprises, in the form shown, a transmitter 5, constituting one type of an electro-magnetic unit, electrically connected through a novel coupling transformer, to be described more fully hereinafter, with a receiver 6 which is a distinctly different type of a unit from transmitter 5. It will be apparent that two or more receivers may be provided for reproducing the motion of the transmitter.

The transmitter is of the type shown and described in the copending application Serial No. 410,343 filed September 10, 1941, now Patent No. 2,342,637 issued February 29, 1944, and assigned to the assignee of the present invention, and comprises a stator and a rotor in cooperative relation therewith, the stator consisting of a core 7 formed as a laminated ring of highly permeable magnetic material such, for example, as "Permalloy" or "Mumetal," having wound thereon a single winding or coil 8 which is tapped at two or more points as, for example, at points 9 and 10, intermediate the ends 11 and 12 of the coil, the ends thereof and the tapped points being angularly spaced one hundred twenty degrees (120°) apart along core 7.

Mounted concentrically within stator core 7 of the transmitter and in magnetic relation therewith, as well as with coil 8, is a rotor element 13 in the form of a magnetic member of marked polarity as, for example, a rotatable permanent magnet having north and south poles as indicated at N and S, providing a uni-directional magnetic flux which enters core 7. The rotor element is shown in the form of a disc magnet, one-half of which constitutes the north pole and the other half the south pole.

The motion of the transmitter unit, above described, is to be reproduced by a receiver unit entirely different from the transmitter. As shown in Figure 1, receiver 6 is located at a remote point and comprises an induction device of the rotary transformer type having a stator element provided with three windings 14, 15 and 16 connected in three-phase relation at junction 17, and a rotor element, adapted for angular movement relative to the windings, having a single phase winding 18 arranged in inductive relation with the three phase connected windings 14, 15 and 16.

Due to the fact that the transmitter unit is of one type utilizing a single winding having therein an energizing current flow of fundamental frequency and the receiver of another and different type, the two units cannot be connected with each other directly because, in addition to the generated secondary harmonic in the tapped portions of the transmitter winding, there is the fundamental component which must be balanced or made ineffective. A novel coupling transformer unit, generally designated at 19, to be described in detail presently, is provided whereby the fundamental component is eliminated and motion of the transmitter is accurately and rapidly reproduced by the receiver.

Current for energizing winding 8 of the transmitter stator is supplied by mains or conductors 20 and 21 which connect with a suitable source (not shown) of alternating current or pulsating direct current, the winding being tapped to the supply mains at 22 and 23. As explained in connection with a similar unit shown by the above referred to copending application Serial No. 410,343, secondary voltages are generated in the tapped sections of winding 8 due to the periodic reversal of the flux produced in core 7 by the periodically varying current flowing in the winding. During one-half cycle of the exciting current flowing in winding 8, the periodically varying flux opposes the uni-directional flux of the rotor in one half of core 7 and, at the same time, aids the uni-directional flux in the other half of the core, while during the other half of the cycle of the exciting current the periodically varying flux aids the uni-directional flux of the rotor in the first-mentioned half of the core and, at the same time, opposes the uni-directional flux in the other half of the core. Thus the winding 8 has a current of fundamental frequency flowing therein as well as secondary harmonics and upon relative movement of the rotor the amount or value of the second harmonics thus generated in the tapped sections of the winding is varied.

Coming now to the novel coupling means for interconnecting transmitter 5 with receiver 6, which comprises transformer 19 of Figure 1, the latter is shown as having a primary winding 24 connected across mains 20 and 21 and having inductively associated therewith secondary windings 25 and 26, the latter being wound in opposition to the former. One side of the secondary 25 is connected by way of a lead 27 with tapped point 9 of the energizing winding 8 while the other side of the same secondary connects by way of a conductor 28 with the free end of stator winding 14 of the receiver. In a like manner, one side of secondary winding 26 connects with tapped point 10 of winding 8 by way of a suitable conductor 29 while the opposite end of the secondary connects through a lead 30 with the free end of stator winding 16 of the receiver. On the other hand, the free end of stator winding 15 of the receiver connects by way of a lead 31 with a central tap on the primary winding.

The primary and secondary windings of transformer 19 are so designed that each of the secondaries produces one-sixth of the input voltage of mains 20 and 21. For purposes of explanation, only the input voltage across mains 20 and 21 will be considered to the exclusion of the secondary harmonics, and for simplicity the voltage may be taken as having a value of six volts. Since receiver stator winding 15 is tapped to primary 24 at a central point thereon, the potential of connecting lead 31 as well as winding 15 will be three volts. Tapped point 9 of winding 8, being located one third the distance of the winding, has a potential of two volts. By virtue of the transformer action, secondary winding 25 will have one volt induced therein so that the potential of lead 28 as well as winding 14 will also be three volts. Tapped point 10, on the other hand, being located two thirds the distance of winding 8, will have a potential of four volts. Secondary winding 26, connected to tapped point 10 by virtue of lead 29, is arranged oppositely to secondary 25 so that there will be a potential drop of one volt, making the potential of lead 30 and winding 16 three volts.

Thus the fundamental components present in coil 8 are eliminated by transformer 19 so that only the secondary harmonics will act to control rotor winding 18 of the receiver. By virtue of the novel transformer coupling, two substantially dissimilar units are brought together to provide a new and novel telemetric system.

Means are now provided for angularly moving transmitter rotor 13 in accordance with and in response to the factor to be measured and to be indicated at the remote or distant receiver in substantially the same manner as disclosed in the aforementioned application Serial No. 410,343. Such means may comprise, as shown, a drive shaft 32 having one end connected to rotor 13 and carrying at its other end a pinion 33 meshing with a gear sector 34 which is pivoted at 35 and connected to a measuring instrument such, for example, as an evacuated bellows or altimeter aneroid 36 by means of a link 37 and a lever 38. It will be obvious that through the connection described, expansion or contraction of element 36 will cause rotor 13 to turn in a clockwise or counterclockwise direction.

Rotor winding 18 is drivably connected in a suitable manner with a pointer 39 superimposed for angular movement over a scale 40 so that motion imparted to transmitter rotor 13 is reproduced in value and direction by receiver rotor 18 which moves pointer 39 relative to scale 40 to indicate the amount of motion transmitted.

For a condition of synchronism wherein rotor 13 and rotor winding 18 are balanced or in step, fundamental components of the input current as well as secondary harmonics are present in the tapped sections of transmitter winding 8 and, as has already been shown, the effect of the fundamental components is eliminated by transformer 19 so that only the secondary harmonics are present in stator windings 14, 15 and 16. As soon as the value or effect of the condition being measured at the transmitter is changed, aneroid 36 responds to the change and angularly displaces rotor 13 relative to its winding 8 and the values of the second harmonic at each of the tapped sections of winding 8 are changed. Balance no longer exists between the transmitter and receiver rotors so that the values of the second harmonics at the receiver stator windings are likewise changed thereby displacing the resultant flux vector at the receiver stator. Because of the fact that the flux within core 7 reverses its direction twice for each cycle of the energizing current, the secondary currents at the receiver stator will have a frequency double the frequency of the input current.

The receiver rotor winding 18 has its own local field by virtue of its connection by way of leads 41 and 42 with the input current source. As pointed out above the secondary currents within the stator have a frequency double the frequency of the input current so that a suitable and known frequency doubler 43 must be interposed between the receiver rotor winding 18 and the mains 20 and 21. To this end the input of doubler 43 is connected with mains 20 and 21 by way of leads 44 and 45 while the output thereof connects with leads 41 and 42. The magnetic field of winding 18 reacts with the displaced flux vector at the receiver stator so that a torque is generated moving winding 18 to a null or in step position with rotor 13 at which time pointer 39 is moved relative to scale 40 to thereby indicate the amount of change of the condition being measured at the transmitter.

In the foregoing manner the inductive device comprising the receiver of Figure 1 is used to reproduce and indicate the amount of motion imparted to the transmitter. The receiver rotor is supplied with twice the frequency of the transmitter input and is under the complete control of the secondary signal from the transmitter. In certain cases, however, it may be desired to use the receiver device of Figure 1 as the transmitter unit and in such an event the transmitter of Figure 1 will be used as the receiver. To this end the arrangement of Figure 2 is provided and comprises as shown a transmitter 106, similar to receiver 6 of Figure 1, having a stator provided with three windings 114, 115 and 116 connected in three-phase relation at junction 117, and a rotor element, adapted for angular movement, having a single-phase winding 118 arranged in inductive relation with the three-phase connected windings 114, 115 and 116.

In a manner similar to that shown in Figure 1, means are provided for rotating winding 118 in accordance with the amount of change of the condition measured which comprises a drive shaft 132 having one end connected to rotor winding 118 and carrying at its other end a pinion 133 meshing with a gear sector 134 which is pivoted at 135 and connected to a measuring instrument such as an aneroid 136 by means of a link 137 and a lever 138.

The receiver unit 105, in this case, is identical with the transmitter 5 of Figure 1 and comprises a core 107 of highly permeable material having wound thereon a single winding or coil 108 tapped at points 109 and 110, the ends and tapped points being angularly spaced one hundred and twenty degrees (120°) apart about core 107. Mounted concentrically within core 107 for angular movement relative to the core and its winding is a permanent magnet 113 which may be connected through suitable means with a pointer 139 superimposed for movement over a scale 140. Rotor 113 is shown in the form of a disc magnet, one half of which constitutes a north pole and the other half a south pole, marked N and S, respectively, in Figure 2.

The ends of winding 108 are connected at taps 122 and 123 for energization with supply mains 120 and 121 which are connected to a suitable source (not shown) of alternating current or pulsating direct current. As pointed out in connection with the description of Figure 1, the flux traversing core 107 will reverse its direction twice for each cycle of the energizing current of mains 120 and 121 so that secondary voltages induced in winding 108 will have a frequency twice the frequency of the input current. Since the secondary voltages at the receiver are twice the frequency of the input voltage, a suitable frequency doubler 143 has its output connected to rotor winding 118 by way of leads 141 and 142 and its input to mains 120 and 121 by way of leads 144 and 145. Thus, the current in rotor winding 118 has a frequency double the frequency of the input current.

Since, in addition to the second harmonics, fundamental components of the energizing current are present in the receiver stator winding 108, the novel transformer of Figure 1 is interposed between the receiver and transmitter to eliminate the fundamental components so that only the secondary harmonics will be present within stator windings 114, 115 and 116. To this end primary winding 124 of transformer 119 is connected across mains 120 and 121 while winding 115 of the transmitter stator is connected by way of a lead 131 to a central point on winding 124. The transformer is further provided with two secondary windings 125 and 126, one of which is wound in opposition to the other. Secondary 125 is connected at one end with stator winding 114 by way of a lead 127 and with tapped point 109 of stator winding 108 by way of a lead 128 while secondary 126 is connected at one end with winding 116 of the transmitter stator by way of a lead 129 and at its other end with tapped point 110 by way of lead 130. In this manner fundamental components are eliminated from windings 114, 115 and 116 so that only the generated second harmonics are present within the transmitter stator.

Because of the inductive relation between transmitter rotor winding 118 and stator windings 114, 115 and 116, angular movement of winding 118 changes the values of the second harmonics generated within the stator windings, the induced voltage in each winding varying in accordance with the angular position of rotor winding 118. The values of the secondary voltages are thus changed at the tapped portions of receiver stator winding 108 whereby the resultant flux vector at the receiver is moved so that it reacts with the magnetic field of the receiver rotor to produce a torque which causes the magnet rotor to turn angularly and bring it into positional agreement with the transmitter rotor. Rotation of the rotor actuates pointer 139 relative to scale 140 to show the amount of angular displacement of transmitter rotor 118 in response to a change in the condition being measured by aneroid 136.

In the foregoing manner a novel telemetric system is provided in which the receiver unit of Figure 1 is used as the transmitter and the transmitter of Figure 1 becomes the receiver.

In some cases it is desirable to create sufficient torque at the receiver to actuate a control surface, valve or other element in accordance with the amount or value of the motion imparted to the transmitter. In such an event the torque generated at the receiver must be amplified and one method of accomplishing this purpose is by providing a follow-up motor which, in bringing the receiver rotor to a null or positional agreement with the transmitter, will also operate the control desired. To this end, therefore, the structure of Figure 3 is provided and, as there shown, the system is essentially the same as that of Figure 1 and all parts corresponding to like parts in Figure 1 are designated with the same reference character plus 200.

The arrangement of Figure 3 differs from the arrangement of Figure 1 in that in the former the receiver rotor, of itself, is incapable of seeking a null or positional agreement with the transmitter rotor once a condition of synchronism has been destroyed. Motion on the part of the transmitter, therefore, results in a change in the secondary voltages at receiver stator windings 214, 215 and 216, as described in connection with Figure 1, so that a signal is induced in rotor winding 218. The signal so induced is fed to the input of a conventional amplifier 250 by way of leads 251 and 252, the output thereof being connected by way of leads 253 and 254 with one phase 255 of a two-phase induction motor, generally designated at 256, and having a rotor 257. The second phase 258 of the motor is connected for constant energization with mains 220 and 221 through a frequency doubler 243, the latter having its input connected to the mains by way of leads 244 and 245 and its output by way of leads 259 and 260 with the second phase of the motor.

The rotor 257 is mechanically coupled through a suitable reduction gearing 261 and a shaft 262 with rotor winding 218. The latter in turn is mechanically coupled with a suitable pointer 239 superimposed for movement over a scale 240. In order that the currents in phase 255 will be 90° out of phase with the current in phase 258 a suitable condenser 263 is provided at the amplifier output.

With the expansion or contraction of aneroid 236, in response to a change in the condition being measured, transmitter rotor 213 is displaced angularly changing the values of the secondary currents at the tapped sections of the stator coil which change is communicated to stator windings 214, 215 and 216 of the receiver. The resultant flux vector at the receiver stator is no longer normal to rotor winding 218 so that a current is induced to flow therein which is amplified by amplifier 250 and fed into second phase 255 of the motor. The second phase 258 being already energized, rotor 257 is turned and through gearing 261 and shaft 262 drives the rotor winding 218 until the latter reaches a null, i. e., the winding assumes a position normal to the resultant flux vector at the receiver stator, at which time the induced signal within winding 218 becomes zero and phase 255 is de-energized. At the same time pointer 239 has been moved relative to scale 240 to indicate the amount of change at the transmitter while any desired control element may be coupled to motor 256 to be actuated thereby in accordance with the change at the transmitter.

Although the transmitter units 5 and 205 of Figures 1 and 3 have been shown as having permanent magnet rotors 13 and 213 actuated by aneroids 36 and 236 it is to be understood that the magnetic rotors shown may be replaced by a magnetic or earth inductor compass as disclosed in the aforementioned application Serial No. 410,343. Moreover, even though rotors 18, 118 and 218 of the inductive devices have been shown as wound, they may be of the unwound type, as well, as shown and described in copending application Serial No. 456,065 filed August 25, 1942, and assigned to the assignee of the present invention.

There is thus provided a novel telemetric system for repeating motion initiated at one point at a different and distant point with the use of two dissimilar units interconnected through a novel transformer, one of the units acting as a transmitter of the motion and the other as a repeater thereof. The system, furthermore, is such that the fundamental components present therein are eliminated. The system may be used to indicate the amount of change at a distant point without the use of a follow-up motor or may include such a motor when a relatively greater amount of torque is desired.

Although three embodiments of the invention have been illustrated and described in detail, various changes and modifications in the construction and relative arrangement of the parts, which will now appear to those skilled in the art, may be made without departing from the scope of the invention. Reference is therefore to be had to the appended claims for a definition of the limits of the invention.

We claim:

1. Means for transmitting motion from one point to another and different point including a transmitter unit and a receiver unit, one of said units comprising annular core means of magnetically permeable material arranged to be traversed by a magnetic field for inducing a magnetic flux therein and provided with coil means thereon whereby secondary harmonics are generated therein due to said magnetic flux, the other of said units comprising a wound stator and a rotor in inductive relation with the stator, a source of periodically varying input current connected to said coil means whereby fundamental components of the input current are induced in said coil means, and transformer means for eliminating said fundamental components comprising a primary winding connected to said current source and opposed secondary windings for interconnecting said coil means with said wound stator.

2. Means for transmitting motion from one point to another and different point including a transmitter unit and a receiver unit, one of said units comprising annular core means of magnetically permeable material arranged to be traversed by a magnetic field for inducing a magnetic flux therein and provided with coil means thereon whereby secondary harmonics are generated therein due to said magnetic flux, the other of said units comprising a wound stator and a wound rotor in inductive relation with the stator, a source of periodically varying input current connected to said coil means of said one unit and to said wound rotor of said other unit whereby fundamental components of the input current are induced in said coil means, and transformer means for eliminating said fundamental components comprising a primary winding connected to said current source and opposed secondary windings for interconnecting said coil means with said wound stator.

3. Means for transmitting motion from one point to another and different point including a transmitter unit and a receiver unit, one of said units comprising core means of magnetically permeable material arranged to be traversed by a magnetic field for inducing a magnetic flux therein and provided with coil means thereon whereby secondary harmonics are generated therein due to said magnetic flux, the other of said units comprising a wound stator and a wound rotor in inductive relation with the stator, a source of periodically varying input current connected to said coil means of said one unit and to said wound rotor of said other unit, whereby fundamental components of the input current are induced in said coil means, and transformer means having a primary winding connected to said current source and a pair of oppositely wound secondary windings, said coil means and said wound stator being interconnected through said secondary windings whereby fundamental components of the input current are eliminated so that only the secondary harmonics are present in said wound stator.

4. Means for transmitting motion from one point to another and different point including a transmitter unit and a receiver unit, one of said units comprising core means of magnetically permeable material arranged to be traversed by a magnetic field for inducing a magnetic flux therein and provided with coil means thereon and having an input and a plurality of tapped sections, said coil means having secondary harmonics generated therein due to said magnetic flux, the other of said units comprising a stator having a plurality of windings arranged in three-phase relation and a wound rotor in inductive relation with said stator, a source of periodically varying input current connected to the input of said coil means and to said rotor whereby fundamental components of the input current are induced in said coil means, and a transformer having a primary connected with said current source and a pair of oppositely arranged secondary windings, one of said stator windings being connected to a central portion of said transformer primary and the other of said stator windings being connected through said transformer secondary windings with the tapped sections of said coil means whereby the fundamental components of the input current are eliminated so that only the secondary harmonics act within the stator windings.

5. Means for transmitting motion from one point to another and different point including a transmitter unit and a receiver unit, one of said units comprising core means of magnetically permeable material arranged to be traversed by a magnetic field for inducing a magnetic flux therein and provided with coil means thereon and having an input and a plurality of tapped sections, the other of said units comprising a stator having a plurality of windings arranged in three-phase relation and a wound rotor in inductive relation with said stator, a source of periodically varying input current connected to the input of said coil means and to said rotor, a frequency doubler interposed between said current source and said rotor, and a transformer having a primary connected to said current source and a pair of oppositely wound secondary windings, one of said stator windings being connected to a central portion of said transformer primary and the remainder of said stator windings being connected through said transformer secondary windings with the tapped sections of said coil means.

6. A repeater system comprising a transmitter unit having an annular core member of magnetically permeable material, means arranged concentrically with said core member for relative movement thereto and providing a unidirectional magnetic field induced in said core member, coil means on said core member having generated therein secondary harmonics due to said induced magnetic field and having an input and a plurality of tapped outlet connections, a receiver unit having a stator provided with a plurality of windings thereon, a rotor member in inductive relation with said stator windings, a source of periodically varying input current connected to the input of said coil means whereby fundamental components of the input current are generated in said coil means, and a transformer comprising a primary winding connected with said current source and having opposed secondary windings for interconnecting the tapped outlet connections of said coil means with the windings of said stator whereby the fundamental components of the input current induced in said coil means are eliminated.

7. A repeater system comprising a transmitter unit having an annular core member of magnetically permeable material, a permanent magnet arranged concentrically with said core member for relative movement thereto and providing a unidirectional magnetic field induced in said core member, coil means on said core member having generated therein secondary harmonics due to said induced magnetic field and having an input and a plurality of tapped output connections; a receiver unit having a stator provided with a plurality of windings thereon, a wound rotor member in inductive relation with said stator windings, a source of periodically varying input current connected to the input of said coil means and to said wound rotor member whereby fundamental components of the input current are generated in said coil means, and a transformer comprising a primary winding connected to said current source and opposed secondary windings for interconnecting the tapped output connections of said coil means with the windings of said stator.

8. A repeater system comprising a transmitter unit having an annular core member of magnetically permeable material, a magnet arranged for movement relative to said core member and providing a unidirectional magnetic field induced in said core member, coil means on said core member having generated therein secondary harmonics due to said magnetic field and having an input and a plurality of tapped output connections, a receiver unit having a stator provided with a plurality of windings thereon; a rotor member comprising a single winding in inductive relation with said stator windings, a source of periodically varying current connected to the input of said coil means and to said rotor winding whereby fundamental components of the input current are generated in said coil means, a transformer comprising a primary winding connected to said current source and having opposed secondary windings for interconnecting the tapped output connections of said coil means with the windings of said stator so that the fundamental components of the input current are eliminated and only secondary harmonics act within said stator windings, the value of the secondary harmonics within said stator windings being changed upon relative movement of said magnet so that a voltage is induced in said rotor winding, and means comprising a follow-up motor connected with said rotor and energized by the voltage induced in said rotor winding.

9. A repeater system comprising a transmitter unit having core means of magnetically permeable material arranged to be traversed by a relatively movable magnetic field for inducing a magnetic flux therein and provided with coil means thereon having an input and output connections, said coil means having secondary harmonics generated therein due to the magnetic flux induced in said core means, a receiver unit having a wound stator and a rotor comprising a single winding in inductive relation with said stator, a source of periodically varying current connected to the input of said transmitter coil means and to said receiver rotor winding whereby fundamental components of the input current are induced in said coil means, a transformer comprising a primary winding connected to said current source and having opposed secondary windings for interconnecting the output connections of said coil means with the stator windings so that the fundamental components of the input current are eliminated and only secondary harmonics act within said stator windings, the value of the secondary harmonics within said stator windings being changed upon relative movement of said magnetic field so that a voltage is induced in said rotor windings, and means comprising a follow-up motor connected with said rotor and energized by the voltage induced in said rotor winding.

10. A repeater system comprising a transmitter unit having annular core means of magnetically permeable material arranged to be traversed by a relatively movable magnetic field for inducing a magnetic flux therein and provided with coil means thereon having an input and output connections, said coil means having secondary harmonics generated therein due to said magnetic flux, a receiver unit having a stator provided with a plurality of windings thereon and a wound rotor member in inductive relation with said stator windings, a source of periodically varying current connected to the input of said transmitter coil means and to said wound rotor member whereby fundamental components of the input current are induced in said coil means, and transformer means comprising a primary winding connected with said current source and having opposed secondary windings for interconnecting the output connections of said coil means with the windings of said stator for eliminating said fundamental components.

11. In combination, a transmitter comprising core means of magnetically permeable material arranged to be traversed by a unidirectional magnetic field for inducing a magnetic flux therein and provided with coil means thereon having an input and a plurality of output connections, said coil means having secondary harmonics generated therein due to said magnetic flux, a receiver having a stator provided with a plurality of windings thereon, a wound rotor member in inductive relation with said stator windings, a source of periodically varying input current connected to the input of said coil means and to said rotor member whereby fundamental components of the input current are generated in said coil means, and transformer means having a primary winding connected to said current source and a pair of oppositely wound secondary windings, the output connections of said coil means being connected with one of the ends of the secondary windings and the stator windings being connected to the other of the ends of the secondary windings so that the fundamental components of the input current are eliminated and only second harmonics act within the stator windings.

12. In combination, a transmitter comprising a stator provided with a plurality of windings thereon, a wound rotor member in inductive relation with said stator windings, a receiver comprising core means of magnetically permeable material arranged to be traversed by a relatively movable unidirectional magnetic field for inducing a magnetic flux therein and provided with coil means thereon having an input and plurality of other connections, said coil means having generated therein secondary harmonics due to said magnetic flux, a source of periodically varying current connected to the input of said coil means and said rotor member whereby fundamental components of the input current are induced in said coil means, and a transformer comprising a primary winding connected with said current source and having opposed secondary windings for interconnecting said stator windings with the other connections of said coil means whereby fundamental components of the input current are eliminated.

13. A repeater system comprising a transmitter having a stator provided with a plurality of windings thereon, a wound rotor member in inductive relation with said stator windings, a receiver having a core member of magnetically permeable material, means arranged concentrically with said core member for relative movement thereto and providing a unidirectional magnetic field induced in said core member, coil means on said core member having generated therein secondary harmonics due to said magnetic field and having an input and a plurality of tapped connections, a source of periodically varying current connected to the input of said coil means and to said rotor member whereby fundamental components of the input current are induced in said coil means, and a transformer having a primary winding connected with said current source and opposed secondary windings for interconnecting the stator windings with the tapped connections of said coil means whereby fundamental components of the input current in said coil means are eliminated so that only secondary harmonics act in said stator windings.

14. A repeater system comprising a transmitter having a stator provided with a plurality of windings thereon, a wound rotor member in inductive relation with said stator windings, a receiver having a core member of magnetically permeable material, means arranged concentrically with said core for relative movement thereto and providing a unidirectional magnetic field induced in said core member, coil means on said core member having generated therein secondary harmonics due to said magnetic field and having an input and a plurality of tapped connections, a source of periodically varying current connected to the input of said coil means and to said rotor member whereby fundamental components of the input current are induced in said coil means, and transformer means having a primary winding connected to said current source and a pair of oppositely wound secondary windings, the secondary windings interconnecting the stator windings with the tapped connections of said coil means whereby fundamental components of the input circuit induced in said coil means are eliminated so that only secondary harmonics act in said stator windings.

JOEL D. PETERSON.
PAUL F. BECHBERGER.

REFERENCES CITED

The following references are of record in the file of this patent:

UNITED STATES PATENTS

| Number | Name | Date |
|---|---|---|
| 2,269,602 | Reichel | Jan. 13, 1942 |
| 2,323,566 | Peterson | July 6, 1943 |
| 2,313,682 | Stuart | Mar. 9, 1943 |
| 2,308,566 | Noxon | Jan. 19, 1943 |
| 2,053,154 | La Pierre | Sept. 1, 1936 |